(No Model.)
L. CUTTING.
EGG TURNING DEVICE FOR INCUBATORS.
No. 320,463. Patented June 23, 1885.
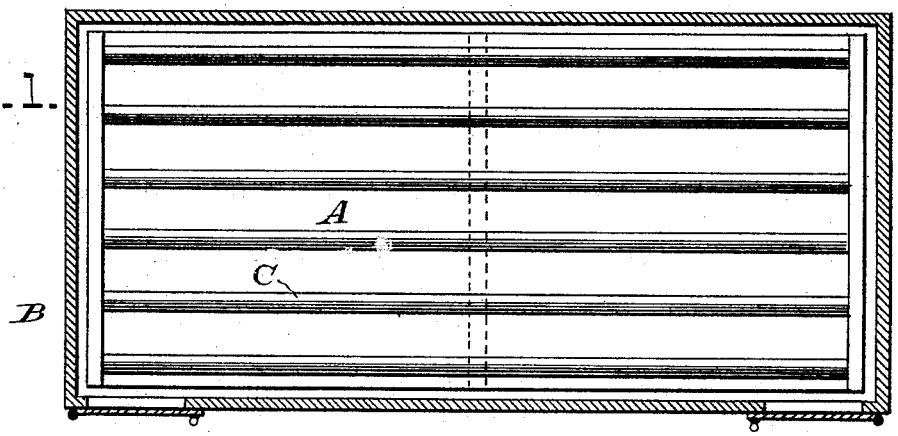
Fig. 1.
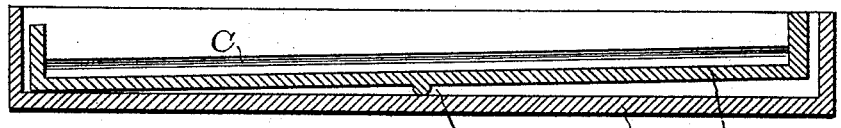
Fig. 2.
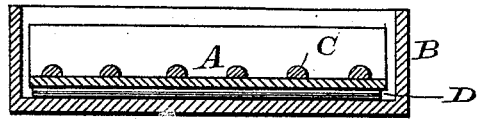
Fig. 3.
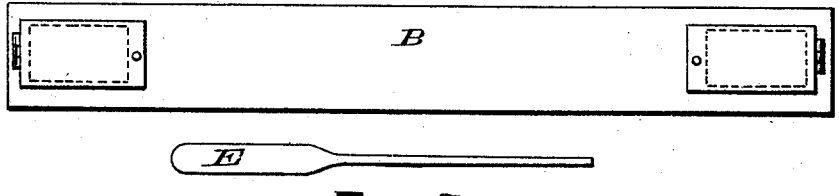
Fig. 4.
Fig. 5.
WITNESSES
Wilmer Bradford
Marshall Wordsworth
INVENTOR
Lewis Cutting
By C. W. M. Smith
Attorney.

UNITED STATES PATENT OFFICE.

LEWIS CUTTING, OF SAN FRANCISCO, CALIFORNIA.

EGG-TURNING DEVICE FOR INCUBATORS.

SPECIFICATION forming part of Letters Patent No. 320,463, dated June 23, 1885.

Application filed December 26, 1884. (No model.)

*To all whom it may concern:*

Be it known that I, LEWIS CUTTING, a citizen of the United States, residing at San Francisco, in the county of San Francisco and State of California, have invented a new and useful Egg-Turning Device for Incubators, of which the following is a specification.

The object of my invention is to provide a means whereby the eggs of an incubator are turned mechanically from right to left or left to right without the necessity of handling the eggs or removing them from the tray or drawers. I accomplish this object by the means illustrated in the accompanying drawings, in which—

Figure 1 is a horizontal section taken through one of the drawers or compartments of an incubator, and showing the egg-holding tray in place. Fig. 2 is a longitudinal section, and Fig. 3 is a cross-section through the drawer and egg-holding tray. Fig. 4 is a front elevation of the drawer, and Fig. 5 is a plan view of the paddle or turning-stick.

Similar letters of reference are used to indicate like parts throughout the several figures.

In carrying out my invention I construct a tray or egg-holder, A, and place it inside of the ordinary drawer or drawers, B, of the incubator. The tray or egg-holder is provided with the usual holes or perforations to permit the heat to ascend up through the holes or meshes, if a wire screen is used. Along the floor of this perforated screen are placed the longitudinal egg-supports C, which consist of half-round rods or bars made of wood or other material, wood being preferable, however. These rods or supports are placed along the floor of the tray a sufficient distance apart to receive and uphold the eggs and leave the body of the eggs exposed to the action of the heat from below, the ends thereof resting upon the half-round supports.

To the bottom of the egg-containing tray, and midway from the ends thereof, I connect a transverse strip or rocker, D, the ends of which may project a little, so as to rest upon the lower portion of the frame of the drawer or container for the egg-tray, and this frame may project inwardly on all sides of the drawer, so as to form ledges to support the ends of the egg-tray, as well as the body thereof, and the transverse rocker.

In operation, the egg-tray is set in the drawer, one tray for each drawer, if more than one drawer is employed in the incubator, and the eggs placed crosswise upon the half-round supports, with the sides of the eggs lying against each other. Care should be taken, however, to leave a space at one end of the row of eggs of sufficient breadth, within which one egg can be turned completely around or over one time, and for uniformity these spaces should all be left at one and the same end of the tray. The eggs are all marked with a pencil at opposite sides of the shell, and the mark on one side placed upward; and when it becomes necessary—say once a day—to turn the eggs, the drawer is opened, and that end of the tray which has the vacant spaces therein is borne downward, which causes all the eggs to turn automatically or mechanically once over by rolling and gravitating to that end of the tray having unoccupied spaces upon the half-round supports thereof, the first egg of the series occupying the vacant space in each row, and so on to the end of the row, leaving an unoccupied space at the opposite end of the row, so that the tilting of the tray in an opposite or reverse direction upon the succeeding day, or as often as required, will cause all of the eggs in the tray to resume their original positions. It is evident, however, that a sufficient number of eggs may be placed upon the supports to occupy the entire space from end to end of the tray, and when it becomes necessary to turn them one egg at either end of the row can be removed and the tray tilted, and when the row has been displaced the egg may be replaced at the opposite end, and thus the whole space of the supports be utilized.

In order to prevent too great a concussion between the eggs when the tray is tilted, an opening, to be covered when not in use, may be made in the front of the drawer near the ends, in which to operate a paddle or narrow blade, E, which is placed in front of the moving row or rows of eggs to ease the fall as they travel or roll to the end of the tray.

Having thus described my invention, what I claim, and desire to secure by Letters Patent, is—

1. In an egg-turning device for incubators, the supplemental tray A within the drawer of an incubator, provided on its under side with a rocker, D, which adapts it to be tilted from right to left or left to right, and thus change somewhat the position of the eggs, constructed and arranged to operate substantially as described.

2. In an incubator, the tray A, provided with longitudinal strips or egg-supports C and rocker D, constructed, arranged, and operating substantially in the manner and for the purpose as herein set forth and specified.

In testimony that I claim the foregoing I have hereunto set my hand and seal.

LEWIS CUTTING. [L. S.]

Witnesses:
WILMER BRADFORD,
CHAS. E. KELLY.